United States Patent [19]
Levy

[11] Patent Number: 5,973,621
[45] Date of Patent: *Oct. 26, 1999

[54] COMPACT KEYED INPUT DEVICE

[76] Inventor: David Levy, 16 Blake St., Cambridge, Mass. 02140

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,756

[22] Filed: Dec. 17, 1996

Related U.S. Application Data

[63] Continuation-in-part of application No. 08/071,242, Jun. 3, 1993, Pat. No. 5,612,690.

[51] Int. Cl.[6] .................................................. H03K 17/94
[52] U.S. Cl. ....................... 341/22; 364/709.15; 400/485
[58] Field of Search ............................... 341/22; 345/160, 345/168; 364/709.15; 200/5 A, 511–513, 302.2; 400/472, 485, 488, 490

[56] References Cited

U.S. PATENT DOCUMENTS

| | | |
|---|---|---|
| 4,400,593 | 8/1983 | Kunz ........................ 200/5 A |
| 4,549,279 | 10/1985 | Lapeyre . |
| 4,634,818 | 1/1987 | Hayes-Pankhurst et al. .......... 200/5 A |
| 4,891,777 | 1/1990 | Lapeyre . |
| 4,912,462 | 3/1990 | Washizuka et al. . |
| 4,994,992 | 2/1991 | Lapeyre ............................ 364/709.15 |
| 5,612,690 | 3/1997 | Levy ........................................ 341/22 |
| 5,691,716 | 11/1997 | Crowley et al. .......................... 341/22 |

OTHER PUBLICATIONS

"Compact Keyboard", IBM Tech. Discl. Bulletin, vol. 13, No. 11, Apr. 1971.

*Primary Examiner*—Thomas Mullen

[57] ABSTRACT

In a keypad device of the type that includes a unique output function as a consequence of physically adjacent keys or key equivalents operated simultaneously: a continuous elastomeric material with integrally molded key cap structure identifying individual and combination keys of minimal height differential with a sealed cursor control device placed with the key matrix a indentation in a non-exposed side near the center of a plurality of individually actuatable key switches; individual key switches in excess of the number of individual key caps.

20 Claims, 9 Drawing Sheets

74

74

Figure 21
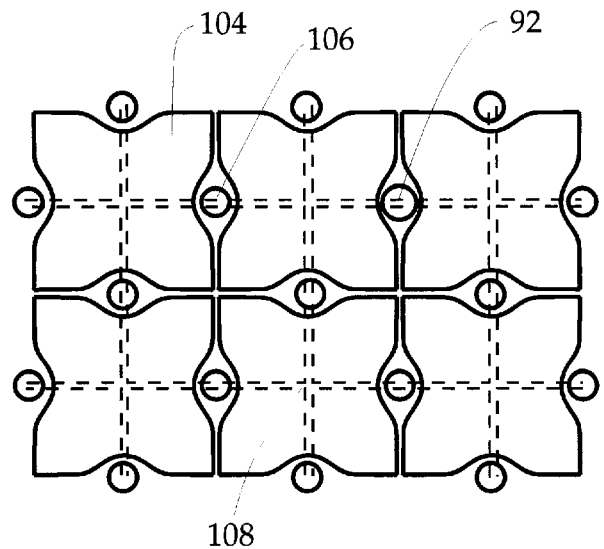
Figure 22
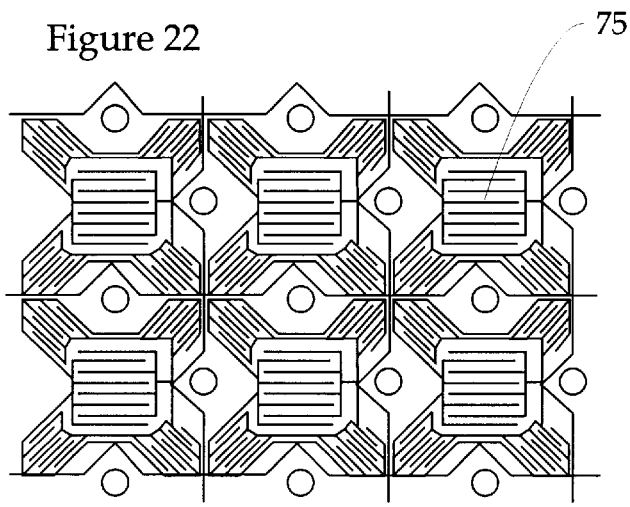
Figure 23
| | | | | | |
|---|---|---|---|---|---|
| 1 | 3 | 1 | 3 | 1 | 3 |
| 2 | 4 | 2 | 4 | 2 | 4 |
| 1 | 3 | 1 | 3 | 1 | 3 |
| 2 | 4 | 2 | 4 | 2 | 4 |

COMPACT KEYED INPUT DEVICE

This application is a continuation in part of U.S. Pat. No. 5,612,690 application Ser. No. 08/071,242 filed Jun. 3, 1993.

FIELD OF THE INVENTION

This invention is in the field of input devices for small electronic products, particularly for communications and data entry, and combination locks.

BACKGROUND OF THE INVENTION

Electronic devices continue to become smaller and more complex. As complexity increases, there is a tendency for these devices to require more buttons, including entire alphanumeric character sets, function-specific keys and ultimately cursor control. Combination keypad locks are more difficult to guess when an increased number combinations are possible.

Examples include: desktop and cellular telephonic products capable of accessing the Internet; two-directional hand held written communication devices; remote controls for television set top boxes offering computer functionality or interactive television; combination keypad lock interfaces and wired telephones with peripheral control abilities.

Such devices are problematic because the human hand remains relatively constant in size while the components shrink. The result is that the interface to the hand—the keypad—often dictates the smallest possible size of an electronic device. It is therefore increasingly important to minimize the size of the keypad without reducing the size of the keys to be smaller than the human hand may use comfortably.

Previous efforts to address this issue consist of the following:

Scale the Keypad Smaller

The most obvious way to increase the number of functions in a given area is to scale the keypad smaller, reducing key cap size and decreasing the distance between key cap centers. This technique causes the user to feel constrained. Products which use small keypads suffer from the impression that they are toy-like, largely because, in fact, they are scaled for use by a child. Decreasing key cap size makes the keys less comfortable to the full-sized adult finger. Decreasing the distance between key cap centers increases the likelihood of accidental input. Decreasing the size of the legend reduces legibility and the ease of viewing. In these ways, this solution is workable but far from optimal.

Chorded keyboards

Chorded keyboards have a relatively small number of keys, often linearly disposed to conform with the resting position of the human hand, which operate in combination to form each input, offering 2 raised to the N number of different inputs where N is the number of keys. The primary problem with this solution is that it requires the user to memorize 2^N input combinations and to develop the necessary motor skills. While this is a workable solution for extremely dedicated users, it is impractical and requires an unrealistically large amount of practice for most.

Modal Solutions

There are a variety of solutions in which individual keys are given a plurality of functions: Time variance modality varies the time between key operations to define the output function. This is non-intuitive and severely restricts the pace at which an operator may work; Function key modality alters the functionality of the keystroke(s) which follow in a predetermined manner. While this is an extremely common technique, it has limitations. While a function key doubles the possible outputs of a keypad, it also doubles the number of keystrokes required. Further, it is impractical to reduce the dimension of the standard 10-key keypad or the space required by the 26 letters of the alphabet by implementing a function key solution because the characters of these sets are of near-equal significance; Force sensitive modality incorporates a plurality of force-levels to a single button, and thereby a plurality of functions. Tests show that there is a wide variation in the forces naturally applied by users and wide variations in the levels of force sensitivity between users. The solution is highly non-intuitive. For these reasons, force sensitive keys are not widely applicable, nor desirable.

Smart Keys

There are a variety of solutions in which the character input by any given key is modified as a consequence of the previous letters entered, based on likely probabilities within a given language, such as that provided by Aiki Ltd, a Seattle company. With this technology, the probability of the device guessing correctly increases with the length of word. However, the first letter of each word in always a problem. Obviously any keyswitch technology, including the object of this invention, may be combined with a Smart key solution.

There are further goals beyond the primary objective of providing a tiny, easy-to-use keypad. Because the environment for miniaturized products is one of constant abuse, reliability and robustness are critical. Devices intended to survive within pockets and to be used at the dinner table must be water and crumb proof. Furthermore, the next generation of miniaturized devices will require a cursor control device that can be fully integrated, yet without compromising on overall robustness, manufacturability, or performance. With absolute miniaturization as the goal, even millimeters become significant for the entire product to fit into a pocket or onto a wrist.

What is desirable is a keypad which increases the number of functions which can be output from a given number of keys and within a defined area, without compromising the ergonomic advantages of full-size and individually operable key caps. It is further desirable to not require any learning or practice. The keypad would be non-modal to eliminate the confusion and errors commonly associated with modalities. Each output function would permanently correlate with a single key cap location. The identifying legends would be full-size for easy identification. Functions would be accessible by a single finger push. The keypad would be small without being toy-like because it is designed to accommodate a full-size human finger. Ideally a compact keypad would effect full-sized key caps with on center distances smaller than full-sized key cap dimensions allow. It would be low-cost yet robust, reliable and include a cursor control.

It is therefore a goal of the present invention to provide: a compact keypad in which each function may be actuated comfortably by an adult-sized human finger; an increased number of functions within a given area without compromising the ergonomic advantages of full-size key caps; a compact keypad in which each function may be accessed by a single finger motion; and an increased number of inputs without requiring memorization, training to use, or the introduction of a modality for normal operation.

It is yet further goal to provide a low cost, reliable, ruggedized miniature product that can withstand normal daily activities such as eating, drinking, and being tossed.

It is yet a further goal to decrease the accuracy required to reliably actuate adjacent keys of a keypad in which multiple adjacent keys are operated with a single push of a finger, especially for molded elastomeric sheets operating over printed circuit boards.

It is yet a further goal to reduce the force required to reliably actuate adjacent keys of a keypad in which multiple adjacent keys are operated with a single push of a finger, especially for molded elastomeric sheets operating over printed circuit boards.

It is yet a further goal to eliminate the electronic ambiguities inherent with simultaneous operation of the adjacent keys in a scan matrix.

It is yet still further a goal to provide a cursor control means that may be integrated within the constraints explained above.

SUMMARY OF THE INVENTION

In this invention the above limitations are overcome and objects and advantages achieved by placing the key cap legends at the interstices of (rather than at the centers of) the key caps. The electronics are designed to register the simultaneous actuation of the plurality of key caps associated with each interstice. Further, in the preferred embodiment, the size of each individual key cap is reduced to approximately half that of a standard full-sized key cap. Therefore, as a finger presses at an interstice, it presses on an area approximately equal to a standard key cap, but is actuating a plurality of key switches rather than only one. In this manner 2N−1 separate inputs may be ergonomically accommodated in the linear width which would otherwise accommodate only N inputs along the same width, thereby providing approximately 4N inputs in an area that otherwise allows only N inputs.

The international (ISO) standard for the smallest dimension between key switches (herein called the key switch dimension) was established at 18 mm because this is considered to be the smallest dimension which allows the human finger easy access to a specific key without the risk of accidental actuation of an adjacent key. The present invention overcomes this limitation by using each area of the keypad redundantly, thereby increasing the number of functions which may be comfortably and reliably accessed in a given area. These advantages are independent of the key switch technology used to implement it.

A further increased number of inputs are made available by additionally using each key individually. There is an apparent contradiction in reducing the size of said key caps and the stated goal of offering ease of use to the user. However, in the preferred embodiment a contoured key cap elevates the centers of each individual key cap, thereby allowing comfortable and ergonomic access to each individual key as well as to the interstices which comprise the for mentioned combination inputs. In embodiments with displaceable key switches, the height of the contour is approximately equal to the distance of key switch displacement. The gaps between the gentle contours offer comfortable and ergonomic access to the inputs located at the interstices because of the increased contact area afforded by the pythagorean distance between key cap centers and the subtlety of the contour.

The improved functionality is substantial. Using the techniques here described one can implement 67 independently actuatable keys in an area 40% smaller than a standard credit card. This is accomplished without decreasing the level of ergonomic comfort to access any of the functions. Conversely, the invention may be used to decrease the size of an existing keypad while retaining the existing functionality, ergonomics and ease of use.

The surface which comes into contact with the finger is here called the contact surface. In the present invention the contact surface may be implemented with a continuous elastomeric or plastic material and the key switches are not required to physically displace during actuation.

The contact surface of the present invention, if comprised of discrete key caps, are designed differently than standard discrete key caps. Standard key caps have a skirt, or taper to provide visual and tactile differentiation between key caps. This also serves to prevent accidental inputs from occurring. The present invention is the opposite in design. The distance between key cap top surfaces is minimized with the goal of reducing the visual and tactile void between adjacent key caps.

The electronics of the present invention are able to sense the simultaneous actuation of adjacent key switches. However, not all key switches associated with an interstice must be actuated to uniquely identify that interstice. Therefore, the electronics of embodiments with a one-to-one correspondence of independent key caps to key switches strive to identify at least the minimum number of key switches required to uniquely identify the interstice. (There is an embodiment in which this objective is not pursued.) A brief timing delay may be incorporated to eliminate non-intended actuations. The implementation of these techniques are known to those in the art. To eliminate the ambiguities inherent in multiple simultaneous switch actuations with a matrix, the printed circuit board may be implemented so that physically adjacent keys are electrically non-adjacent by designing the matrix in an alternating pattern.

The contact surface of the present invention, if comprised of a molded continuous elastomeric sheet is implemented with conductive elements on the back, held from non-desired contact from a printed circuit board by spacing nubs. The printed circuit board provides a switch matrix which may be scanned and decoded by a microprocessor, as in the discrete key cap embodiment above. A finger pressing upon the elastomer forces the conductive elements into contact with the printed circuit board. The continuous elastomer embodiment offers a lower cost solution than the discrete switch component solution and eliminates the gaps between keys, allowing the unit to be sealed, preventing contamination by particulates and liquids that prove a severe problem in pocket-held devices intended for use in the course of daily life.

Because the legends of a sub-miniaturized keypad device are located at a distance significantly less than suggested by the human finger, it is easy for a finger to errantly strike a legend. By dividing each finger-sized area of a continuous key array into four switches, the information content has been distributed to an area commensurate with the human finger, significantly reducing the number of errant strikes: an object of the copending application. However, this quadrant-based design still requires the user to place the center of finger contact at the intersection with sufficient accuracy to reliably strike at least opposing corners of the quadrant. One means to minimize the force required to actuate adjacent switches is to add a small concavity to the underside of the elastomer underneath the elevated key cap centers, reducing the force expended in the effort of compressing elastomeric material, thereby maximizing the effort expended toward deflection and hence actuation of adjacent switches.

However, it is desirable to afford the user an even greater degree of latitude without increasing the risk of an errant key output. In the preferred embodiment of the present invention, each combination key has more associated switches than associated individual keys, thereby reducing the accuracy required to strike associated combination characters. A variety of techniques are used to identify the user's intended finger motion.

The continuous elastomer embodiment also enables a next-generation of robust pocket-sized devices through complete integration of a cursor control device in an environmentally isolated unit. By forming the cursor control device surface of the material of the keypad surface, products may be low cost, thin and liquid and particulate-proof. To further decrease the thickness of the product, the mechanics of the cursor control device may be placed deeper within the product, rather than at the surface. Variations in height of the molded surface are minimized as much as possible without losing visual and tactile differentiation.

BRIEF DESCRIPTION OF THE DRAWINGS

FIG. 21 shows the underside of a continuous elastomer with a contact surface offset from the conductive surfaces underneath.

FIG. 22 shows an alternate embodiment of strike pad switch.

FIG. 23 shows a generic layout used to eliminate electrical ambiguities.

DETAILED DESCRIPTION

Figure 1:
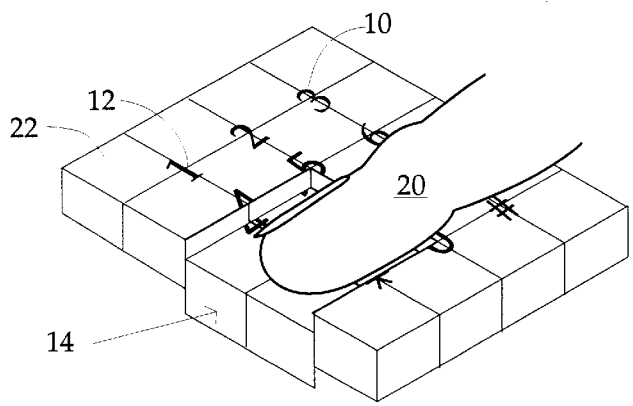
FIG. 1 shows a perspective view of a finger actuating the function "number 7" in a telephone keypad embodiment of the present invention.
Figure 3:
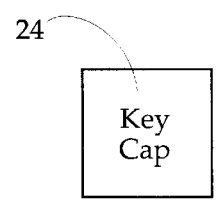
FIG. 3 shows a standard key cap as a dimensional reference.

FIG. 1 shows the present invention embodied as a compact telephone keypad during actuation by a finger 20. Each interstice legend 10 is placed at the interstice 12 formed by the intersection of associated key caps 14. The term "associated key caps" 14 will be used throughout this document to refer to the set of individual key caps 22 which are designed to operate in unison and thereby inform the control electronics that the user intends the function identified by the interstice legend 10 located at the intersection of the associated key caps 14. In this embodiment each interstice legend 10 has four associated key caps 14 and each individual key cap 22 is sized such that each group of four associated key caps 14 are approximately comparable in size to a standard individual key cap 24, as shown in FIG. 3. The finger 20 is shown pressing the associated key caps 14 which actuate the number "7". The figure is not to scale.

Figure 2:
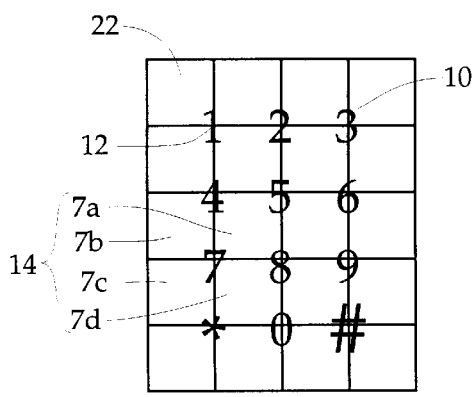
FIG. 2 shows a plan view of the drawing of FIG. 1 with the finger removed.

FIG. 2 shows a plan view of the keypad shown in FIG. 1 with the finger 20 removed for clarification. The four key caps 22 associated with the legend 10 "7" are labeled 7a, 7b, 7c, and 7d.

This embodiment of the invention allows approximately 2n−1 legends, and hence 2n−1 functions, to fit into the linear distance which normally allows only n legends (and n functions) using key caps the size of standard individual key caps 24. This is the equivalent of $4n^2-4n+1$ full-sized keys fitting into the area of n full-sized keys. FIG. 2 is submitted as a 1-to-1 scale drawing, allowing the reader to more easily imagine using the invention.

FIG. 3 shows a standard individual key cap 24 as reference. This figure may be used to establish a real world scale for the other 1-to-1 (full scale) figures independent of the scale to which these drawings may be reproduced.

Figure 4:
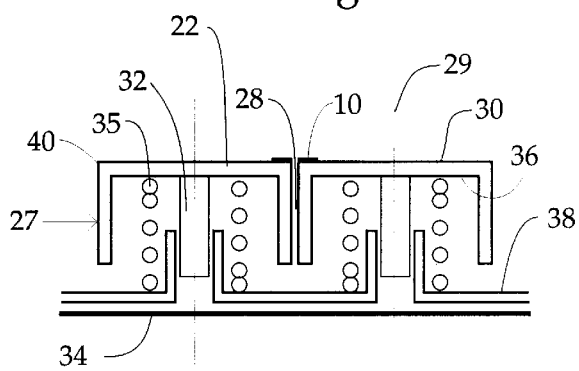
FIG. 4 shows a side view of generic key cap and key switch as a reference.

FIG. 4 shows two generic displacement-actuated discrete key switches as a reference. The figure is not to scale. There are three primary differences between the design parameters of key switches for standard discrete key caps and those of the key switches for this invention. The key caps of the invention are significantly smaller than conventional key caps. The reduced dimension of the top surface places less torque on the key switch mechanism 27 which may therefore be of lower tolerance and/or rigidity without resulting in the key caps binding due to torque applied off the central axis 29. The side 28 of each key cap 22 abuts the side 28 of the adjacent key cap 22 and the peripheral edge defined by the radius 40 is closer to the adjacent key cap 22 and its radius 40 than adjacent key caps of the standard individual key cap 24 design. The distance between the radii 40 of adjacent top surfaces 30 is approximately 1 mm. A contact element 32 contacts the input element 34 when the key cap 22 is pressed. A spring element 35 exerts force upon the inner surface 36 and the housing 38 and raises the key cap 22 when it is not in use. The force created by the spring element 35 is chosen according to the number of key caps 22 which comprise the associated key caps 14 in the chosen embodiment. (Embodiments with fewer and greater number of associated key caps 14 are discussed below.) The top surface 30 is relatively flat and onto it is disposed the interstice legend 10. The dimension between the central axes 29 is known as the key switch dimension 33.

Figure 5:
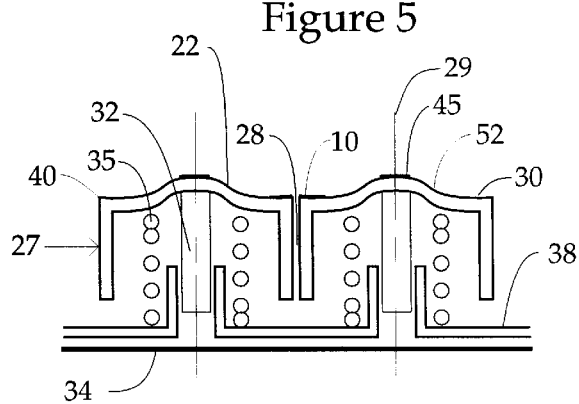
FIG. 5 shows a side view of a discrete key embodiment.

FIG. 5 shows a discrete key cap implemented with the same key switch mechanism as shown in FIG. 4 with a center legend 45 aligned with the central axis 29 and elevated above the top surface 30 by a contoured dome 52. Other contours may be used. The center legend 45 is elevated by approximately the same distance as the stroke of the key switch mechanism 27. An interstice legend 10 is disposed onto the top surface 30. The graphic comprising each, interstice legend 10 is disposed, approximately equally on all four of the associated key caps 14.

Figures 6, 7A, 7B:
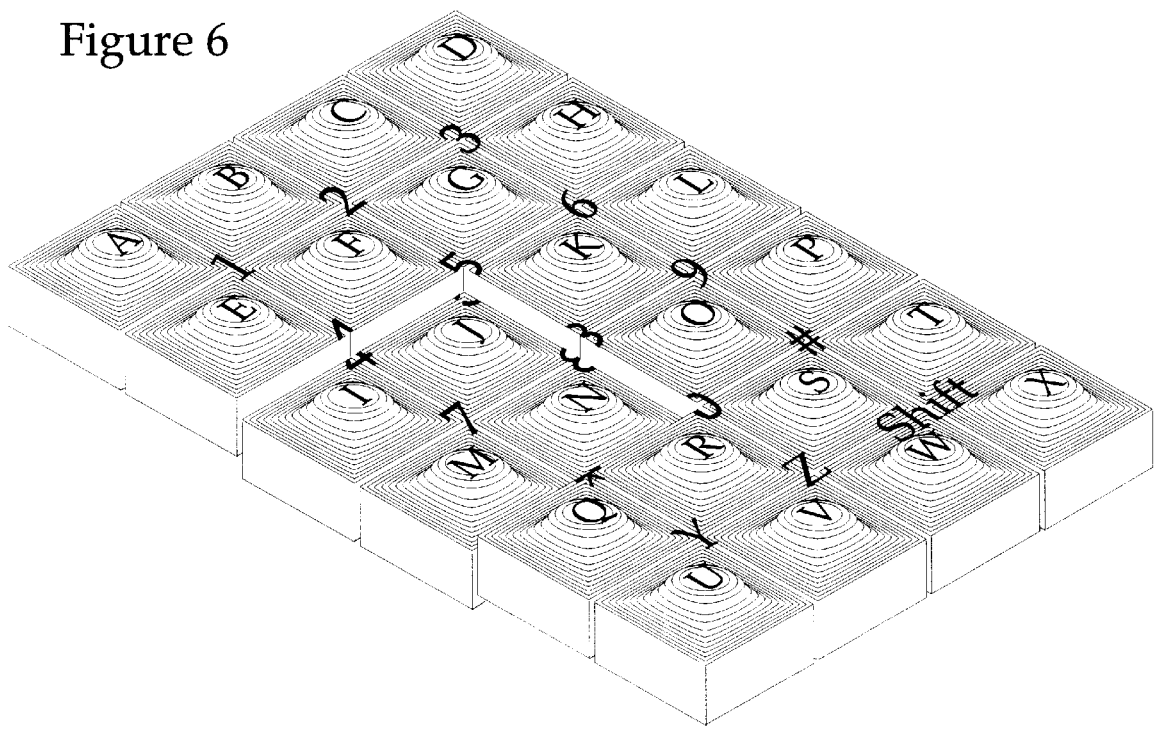
FIG. 6 shows a perspective view of a discrete key embodiment.
FIGS. 7a and 7b show plan views of two potential layouts of alphanumeric character sets.

FIG. 6 shows a perspective view of a discrete key cap embodiment with the number "7" actuated. The drawing is larger than life size.

FIG. 7a shows a plan view of the drawing of FIG. 6. A standard numeric keypad is implemented on the interstice legends 10 and the alphabet on the center legends 45. The drawing is larger than life size.

FIG. 7b shows an embodiment with a standard numeric keypad implemented on the center legends 45 and the alphabet on the interstice legends 10. The drawing is larger than life size.

Figure 8:
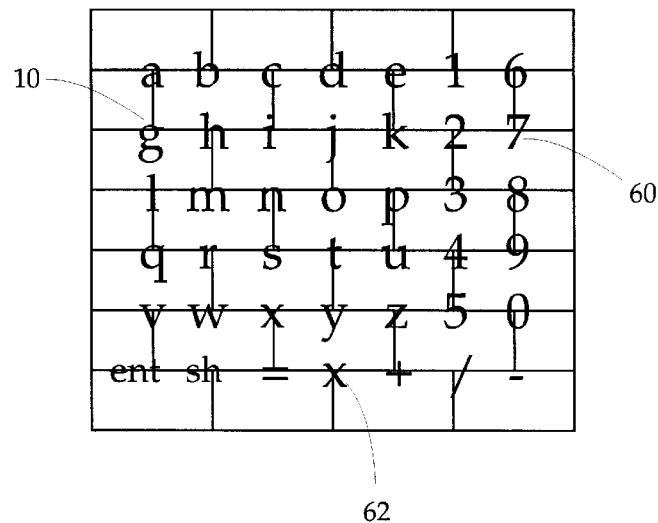
FIG. 8 shows an alphanumeric character set and calculator keys in a brick patterned compact keypad.

FIG. 8 shows an embodiment of an alphanumeric character set 60 and calculator keys 62 in a brick patterned compact keypad.

Figure 9:
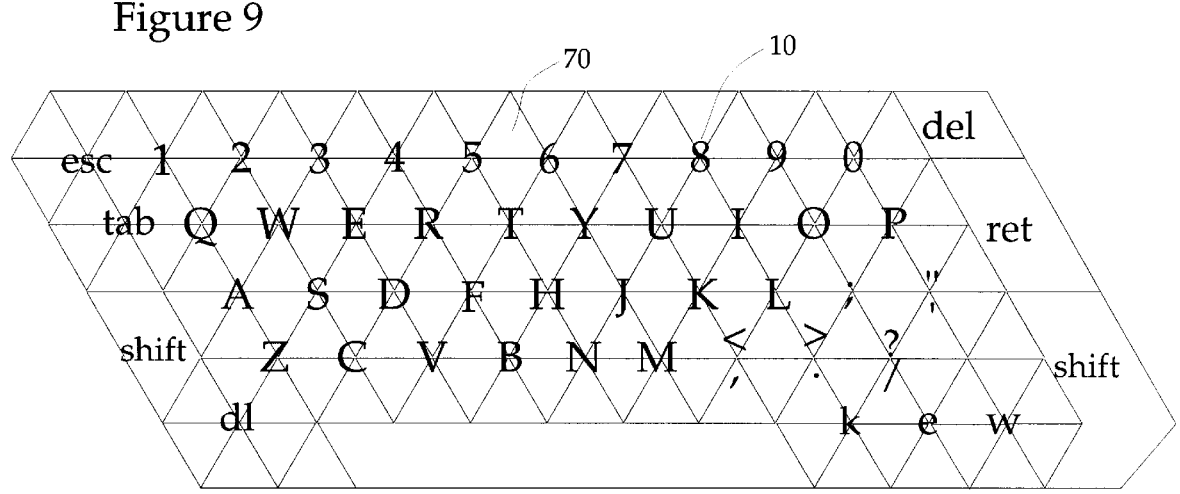
FIG. 9 shows an alphanumeric character set with triangular key cap sub-units.

FIG. 9 shows an embodiment of an alphanumeric keypad using triangular key caps 70 forming hexagons with interstice legends 10. The primary advantage to this configuration is to offset each key in a manner similar to a standard typist's keyboard. This offers full-sized keys in a well-known familiar configuration in approximately one-third the area. The drawing is to scale. Each key may be actuated independently by adding a contoured dome 52.

Figure 10:
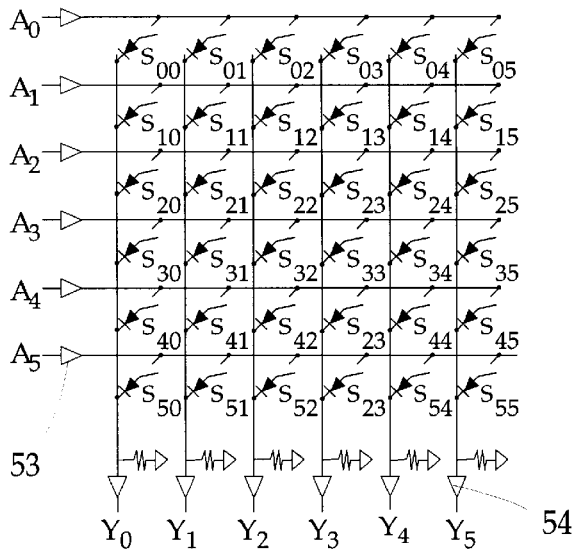
FIG. 10 shows a diode matrix for full decoding.
Figure 11:
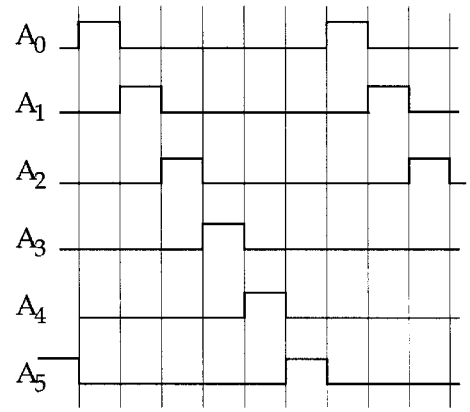
FIG. 11 shows the timing diagram for the electronic design of FIG. 10.

There are a wide variety of electrical solutions. FIG. 10 shows a diode matrix of a 5×5 matrix offering full decoding to the keypad. The drivers 53 inject a signal which presents a unique output composite to the receivers 54 as shown in FIG. 11. In this configuration the relative physical position of the switches are independent of the actual matrix connection (i.e. a four switch combination can be actually implemented using any four of the 36 switches shown). This statement is not true for FIG. 12 where the keys must be arranged physically in the same relative relationship shown in the drawing. Sensing algorithm: If switch Sij is closed, a high level is sensed on output Yz when input Ai is active.

Figure 12:
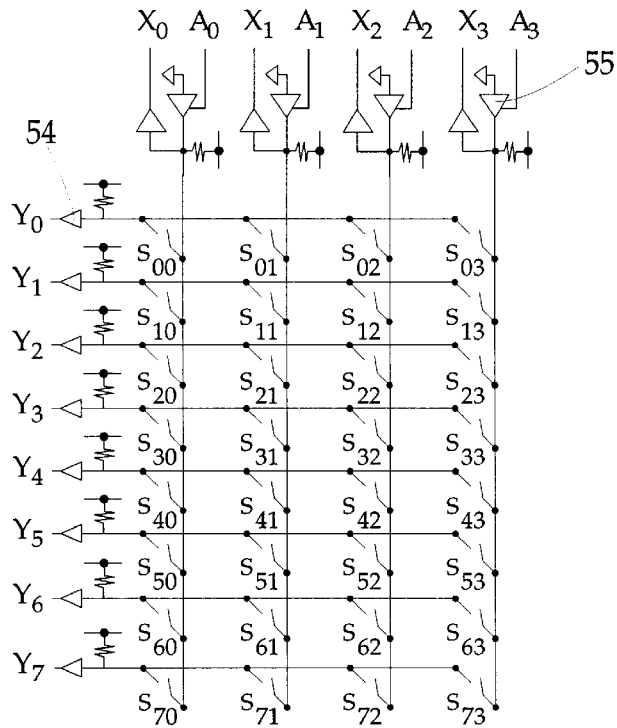
FIG. 12 shows an open-drain or tristate driver and receiver solution.

FIG. 12 shows an open-drain or tristate driver 55 and a receiver 54 solution which does not offer full decoding, but is nonetheless adequate to the application. A "1" on Ai enables the tristate driver which drives a "0" on the vertical line. If switch Sij is closed then a low level is sensed on output Yj when input Ai is active.

Sensing Algorithms
Single Keys
If switch Si,j is closed a low signal level is sensed on output Yj when input Ai is active.
Four Key Combinations (which can be Defined by any Three Keys of Set)
If switches: Si,j; Si,j+1; and (Si+1,j OR Si+1,j+1) are closed a low signal level is sensed on the outputs: Yi; Yi+1; and Xj+1 when input Aj is active and on the outputs Yi; Yi+1 and Xj when input Aj+1 is active.
If switches: Si,j; Si+1,j+1; and (Si,j+1 OR Si+1,j) are closed a low signal level is sensed on the outputs: Yi, Yi+1 and Xj+1 when input Aj is active.
If switches: Si,j; Si+1,j+1; Si,j+1 and Si+1,j are closed a low signal level is sensed on the outputs: Yj; Yj+1; and Xi+1 when input Aj is active, and on the outputs Yi; Yi+1 and Xj when input Aj+1 is active.
Two Key Combinations
If switches Sij and Si,j+1 are closed, a low signal level is sensed on Yi and Xj+1 when Aj is active and low level is sensed on Yi and Xj when Aj+1 is active.
If switches Sij and Si+1,j are closed, a low signal level is sensed on Yi and Yi+1 when Aj is active.
If switches Sij and Si+1,j+1 are closed, a low signal level is sensed on Yi when Aj is active and low level on Yi+1 when Aj+1 is active.

Note that any two diagonally oriented keys uniquely identify the associated set of keys.

Figure 13:
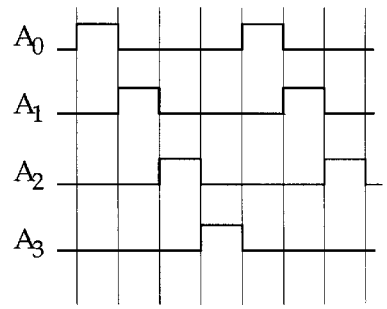
FIG. 13 shows the timing diagram for the design of FIG. 12.

FIG. 13 shows the timing diagram for the design of FIG. 12. Inputs can be erroneously read if the matrix is scanned too slowly and without a validation constant. Scanning must be faster than human response time, but without wasting power. A scan rate of approximately 0.030 sec per matrix is adequate. Validation time constant is the time (in scanning cycles) that a key or key combination must be maintained to be recognized as a valid input. This value can be user selected. Variously, the validation time constant may be adaptable such that a large number of repeated correction strokes will result in the validation constant being increased automatically. Likewise, an adaptable validation constant may be lowered automatically to a threshold level if the user does not make a mistake for an extended period. It is also possible to monitor forbidden keystroke combinations (potentially two-stroke combinations) and automatically adjust the validation constant to a value longer than the three-sigma distribution of this duration.

Figure 14:
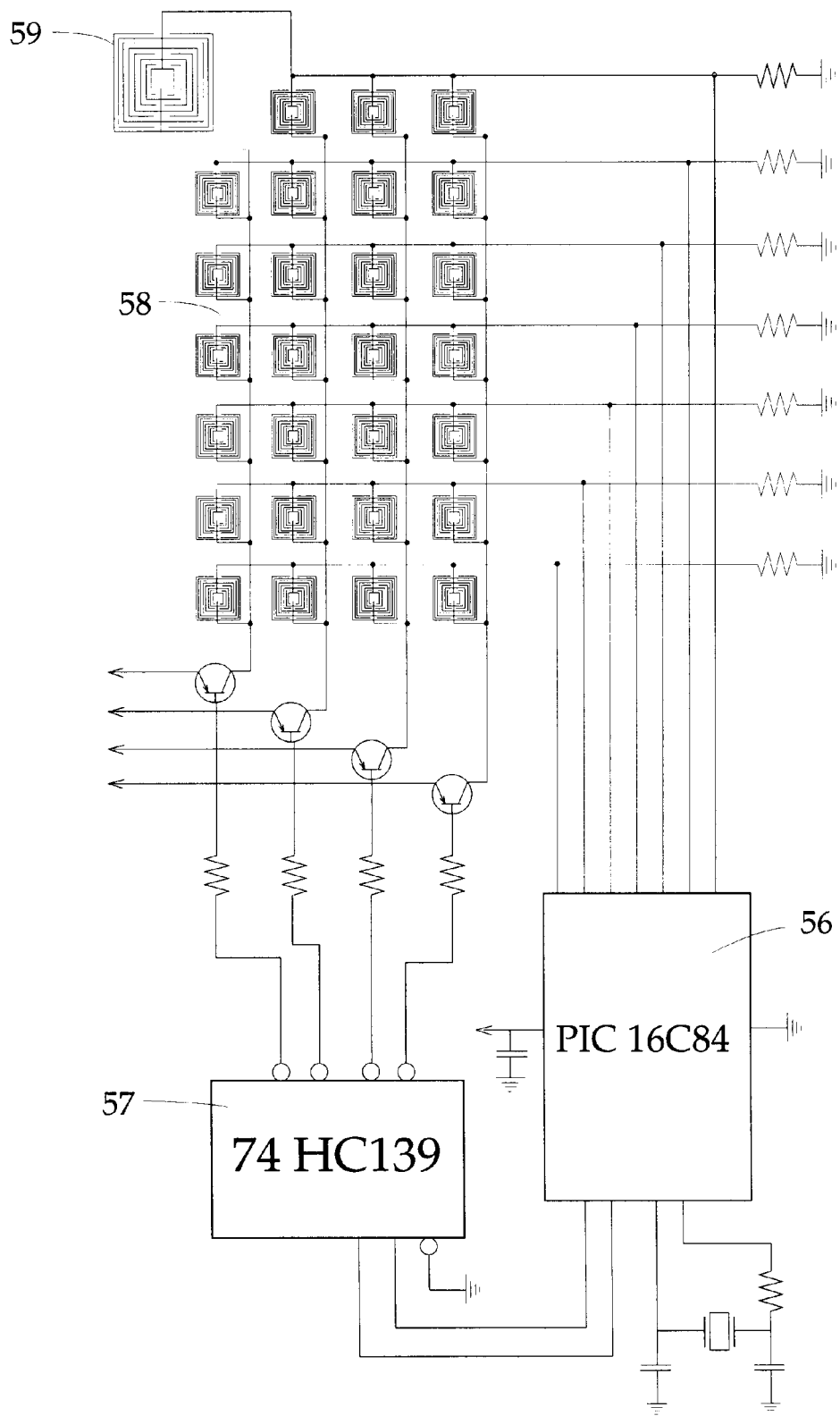
FIG. 14 shows an alternate electronic design approach.

FIG. 14 shows another circuit that may be used to scan the matrix 58. The microprocessor 56 outputs a row "number", 0–3 which goes to the 2 to 4 line decoder 57. The 2 to 4 line decoder 57 drives the corresponding output low, which turns on the transistor, which drives the entire row low. The microprocessor 56 then reads the columns to see if any of the columns are low, which would indicate a pressed key cap. (There are pullup resistors on the columns so if none of the keys are pressed, the columns will read high). The microprocessor 56 is constantly driving the rows and reading the columns. If a key is down for three consecutive scans, it is considered valid. After this is detected, the microprocessor 56 then looks to see if any of the adjacent keys are activated to decide whether it is single key or not. If the appropriate adjacent keys are activated, the "chorded" (combination) key is sent, otherwise the single key is sent. There is an additional 2 to 4 line decoder 57 not shown. Note that in the continuous elastomer embodiment, some or all of the scan matrix traces may be incorporated directly into the keypad elastomer, with a corresponding relocation of the switch means.

The preferred strike pad switch 59 is shown enlarged at the upper left. Because each corner is symmetric about the center, the design offers consistent response from each individual key as it contacts the printed circuit board and is optimized for orthogonally oriented radial ridges on the keypad elastomer.

FIGS. 15a–d show the advantages of the preferred switch layout: to use more than four switches underneath a set of four associated key caps 14. This layout is optimized for a continuous elastomer key cap implementation, such as shown in FIG. 17. FIGS. 15a–d show the upper left region of FIG. 16a with a schematic switch matrix drawn exposed. Each square represents one switch of the matrix 58, such as shown in the strike pad switch 59 of FIG. 14. The region of finger contact that generates a significant force against the keypad is idealized by contact circle 61 with peak force point 63. In the figures, non-capitalized letters are used to identify individual switches in the matrix.

Figure 15A:
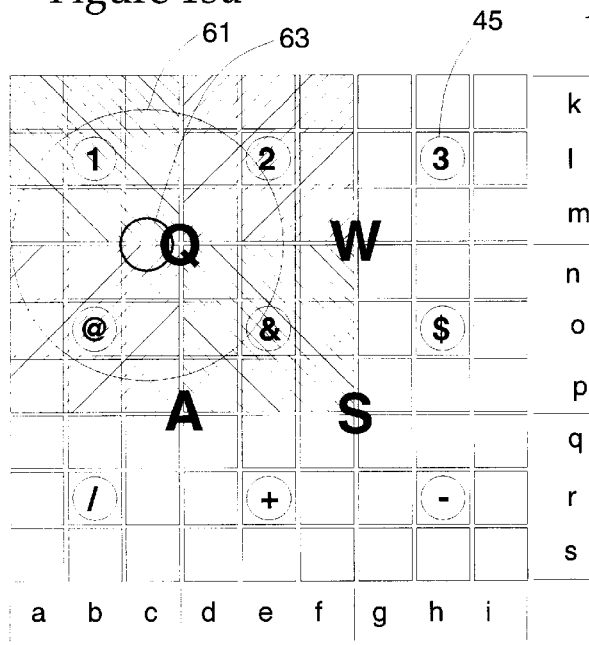
FIGS. 15a–d show the advantages of more than four switches underneath a set of four associated key caps.
Figure 15B:
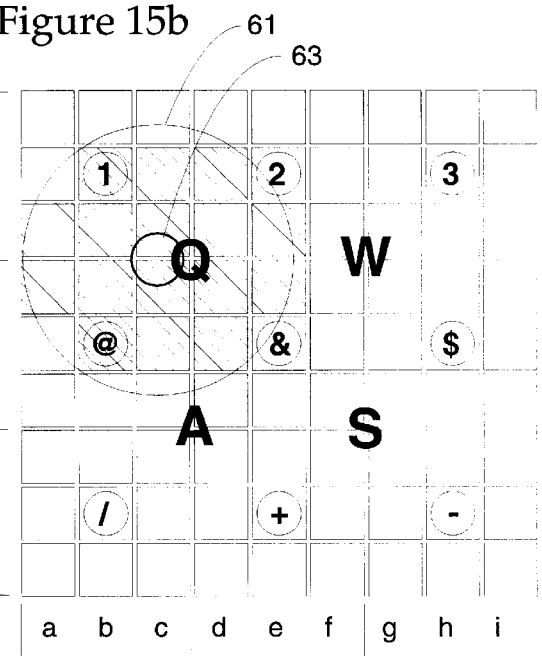
Figure 17:
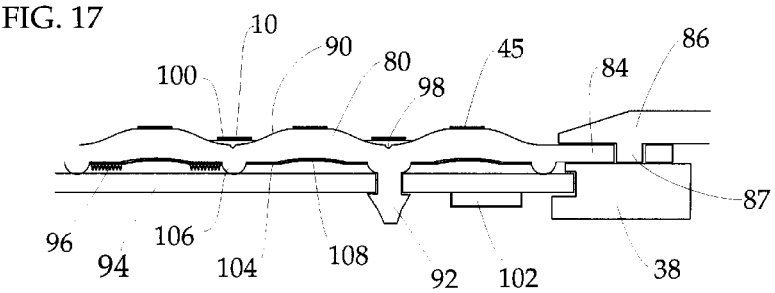
FIG. 17 shows a continuous elastomer embodiment of the invention with PCB.
Figure 18:
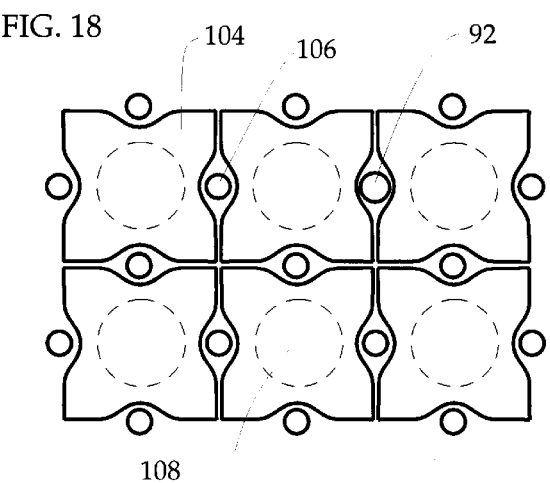
FIG. 18 shows the underside of a continuous elastomer embodiment.

FIG. 15a shows the four quadrants comprising the "Q" combination key as implemented in the copending application: four switches associated with four center legends 45. To show this, nine switches of the present invention are drawn cross-hatched as a single switch. The contact circle 61 shows an inaccurately placed finger. The peak force point 63 is located off-center to the intersection of the four keys and therefore the "2" and "&" keys are exposed to a lower actuation force, and therefore a lower probability of being actuated by the finger. (Note: two other solutions to this problem are shown in FIGS. 17–18 and FIG. 21.) FIG. 15b shows an object of the present invention: a quantity of switches in excess of the quantity of center legends 45. The contact circle 61 is inaccurately placed as in FIG. 15a, yet the force discontinuity demonstrated in FIG. 15a has been distributed over a number of data points, thereby increasing the robustness of an intended input and hence the likelihood that the force provided by the finger will result in the intended output. The cross-hatched switches beneath the contact circle 61 are activated. The intended input "Q" may be well-ascertained from the information provided by scanning the matrix in the following manner: If one assigns center legends 45 to switches beneath (bl, el, bo, eo) and intersticial legends 10 to the switches beneath (cm, dm, cn, dn), it can be generalized that the intended input is the one that has only one of its class of legend (center or interstitial) with assigned switches activated.

Figure 15C:
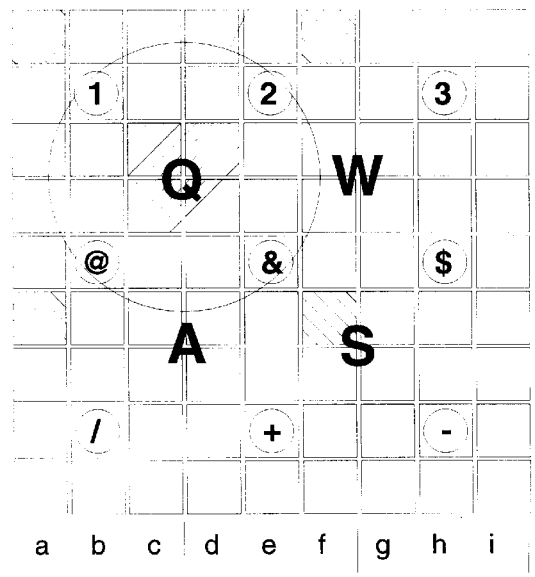
Figure 15D:
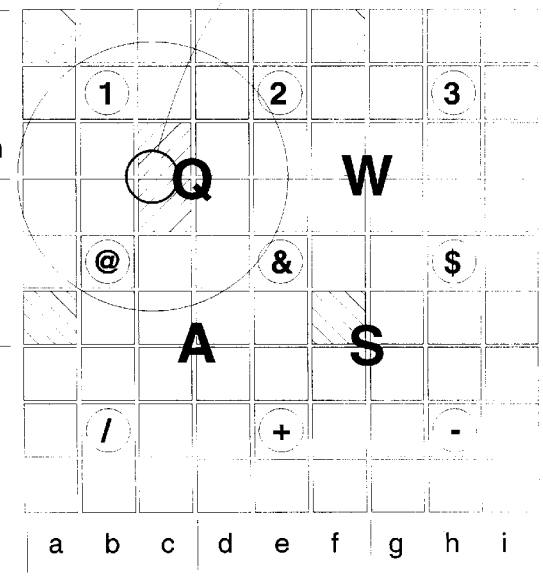

FIG. 15c shows an alternate approach. The nearer to the peak force point 63 any given switch lay, the more likely is that it will be activated. However, sufficiently distant keys, such as ak, kf, pa, and pf will not be activated. Therefore, an intended "Q" may be reliably determined by establishing contact at mc, md, nd or nc AND by establishing a lack of contact at ak, kf, pa, and pf. Such a detection scheme offers dramatically increased reliability over merely detecting the reliable keys near the peak force point 63, especially because there will inevitably be other keys activated that may readily be associated with more than one function, such as co, do, en, em, ld, lc, bn, and bm. As shown in FIG. 15d, a slight error in the positioning of contact circle 61 would contact nb, nc, mb and/or mc, yet still not contact at ak, kf, pa, and pf. Moreover, an intended contact of the "1" would certainly activate ak. By assigning certain keys as a requirement for actuation and to require others to not have actuated, a high degree of reliability may be realized, even with inaccurate finger placement. Extent may be determined by utilizing an unexpectedly large number of switches beneath a set of key caps.

The contact circle 61 is inaccurately placed as in FIG. 15a, yet the force discontinuity of FIG. 15a has been distributed over a number of data points, thereby increasing the robustness of an intended input and hence the likelihood that the force provided by the finger will result in the intended output.

Clearly, the techniques of FIG. 15 may be combined together as well as with a variety of other scanning techniques, such as: Scan for first contact and then narrow scan to region of touch. Additionally, analog sensing techniques to measure the force applied to determine the location of the peak force point 63, and thereby to better assign the intent of the user. This can be achieved by designing the conductive region 104 with a material of finite resistance that increases with the force of contact (a property inherent in many moderately conductive materials) and then measuring resistance values across individual switches. A similar approach seeks to identify the order of switch activation within the contact circle 61 to determine the propagation of the force profile as the finger presses the contact surface 90 of the key board. A library of errors and their subsequent corrections may be used to modify the output of the device as a function of errant key strikes, allowing the device to compensate for use characteristics of the user.

A greater or lesser number of switches (than the nine illustrated here) may be used underneath each individual key cap without deviating from the spirit of the invention, as long as the number of associated switches exceed the number of associated key caps.

Figure 16A:
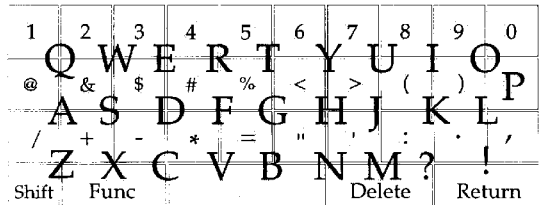
FIG. 16 shows a QWERTY-like layout of keypad.
Figure 16B:
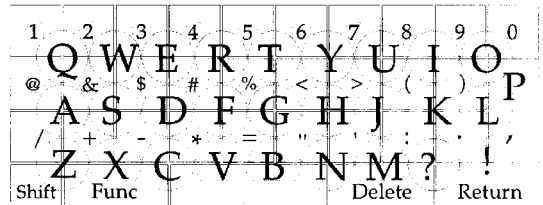

FIG. 16a shows a QWERTY-like layout in a full-scale drawing. Note that the key caps that operate in combination form a single "key" contact surface large enough to operate with a thumb. The "P" key has been displaced from the traditional QWERTY matrix to demonstrate the layout varieties available. Alternately the letter characters may be placed onto the individually actuated key caps to produce the result of a continuous QWERTY row. Extended keys such as the space bar 74 have redundant key switches. FIG. 16b shows the same layout in which the interstitial pads 100 form a bowl-like shape as the peripheries nearly touch the area that defines the center legend 45. The on-center distances of the independently actuatable key caps remain approximately half that of the adult human finger.

FIG. 17 shows a partial sectional view of the continuous elastomer embodiment of the invention. On the right side of the drawing the elastomer material 80 continues beyond the contact surface 90 to provide a constraint flange 84 with which to constrain the elastomer and includes holes or dimples 87 to further increase the ability of the device to constrain the elastomer material 80. While not shown, the constraint area 84 may be offset orthogonally from the contact surface 90. Restraint prong 92 at the rear of the elastomer material 80 includes a barb that protrudes through the printed circuit board 94, preventing the elastomer material 80 from displacing orthogonally outward from the printed circuit board 94. Alternately, an adhesive may be used. The difference in height between the intersticial legend 10 and the center legend 45 is approximately 0.3–1 mm. The preferred height is 0.5 mm. Though small, experiments indicate that this difference in height alone is enough to enable operation of key switches that would otherwise be far too close together for even a modicum of functionality by providing tactile and visible identifiers to distinguish the elevated keys from the non-elevated keys. Note that the overall height from the center legend 45 to the textural gaps 98 may exceed the difference in height between the intersticial legend 10 and the center legend 45, thereby creating greater visual differentiation than the tactile difference between the height of the intersticial legend 10 and the center legend 45. A spongy, textured or ridged surface 96 may be used to increase reliability of electrical contact with the printed circuit board 94. An interstitial pad 100 slightly larger than the interstitial legend 10 provides a flat surface and locally eliminates the textural gaps 98 between adjacent key caps 22, thereby easing printing requirements on both accounts. Electronic components 102 may be manufactured directly onto the printed circuit board 94, allowing complete integration of the present invention and the product into which it is built.

FIG. 18 shows a portion of the underside of a continuous elastomer embodiment in which the number of switches correlate with the number of individual key caps. One of many possible designs of conductive region 104 is shown. Each region is floral-shaped and avoids interference with the stroke pins 106 and restraint prongs 92. The conductive region 104 is here drawn at its maximum extent. The exact extent of the conductive region 104 must allow for imprecisions of manufacturing and the incidental contact that occurs when touching an individual adjacent key. A central region 108 may be recessed slightly to increase the robustness of electrical contact at the corners of each individual key. Increased robustness is accomplished as follows: to achieve electrical activation of associated key caps, the user must activate at least two diagonally opposed associated individual key caps. If the user is slightly off-center of the interstice, there will be a tendency for the key(s) toward the off-center direction to strike the printed circuit board 94 first and therefore with greater force. Recessing the region in the centers of individual key caps 22, causes the material beneath the finger to offer less resistance to the portion of the finger located in the direction of the offset, allowing the elastomer material 80 underneath the entirety of the finger to compress and deform more readily with a given force, thereby increasing the deflection for a given force and reducing the overall force required to actuate the minimum number of individual keys of an associated set.

Figure 19:
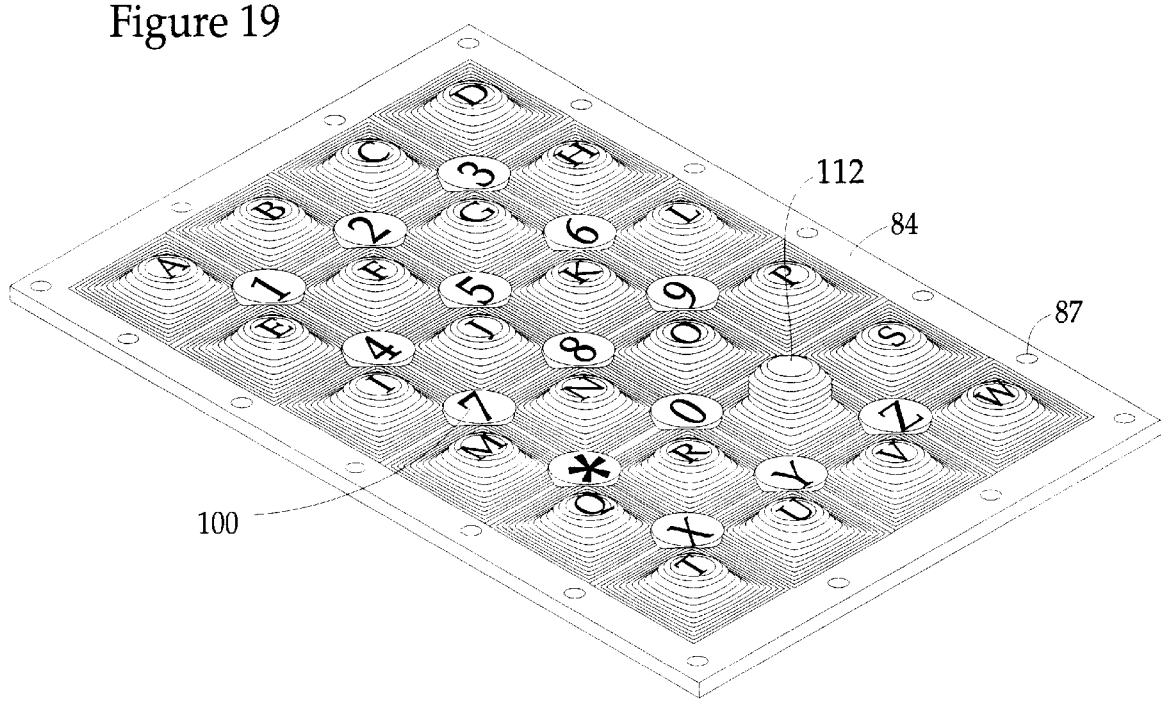
FIG. 19 shows an isometric view of a continuous elastomer with an integrated pointing device.

FIG. 19 shows the preferred embodiment of an isometric view of a keypad with a pointing device 112. The pointing device 112 is integrally molded within the elastomer to disallow liquids or particulates from lodging between the pointing device 112 and the keypad components. Note that the pointing device 112 has replaced one of the keys, rather than being inserted between. While a gasket may be used if the pointing device 112 and the elastomer material 80 are manufactured independently, the preferred embodiment saves cost, presents a cleaner appearance, and provides a more robust liquid barrier. The pointing device 112 may also be introduced directly into the array of characters (as shown) without modification of the array by incorporating a modality that establishes when the cursor control point 116 functions as a pointing device 112 and when it functions as the character, preferably one of low utility. Alternately, the pointing device 112 may be placed at the interstice.

Figure 20A:
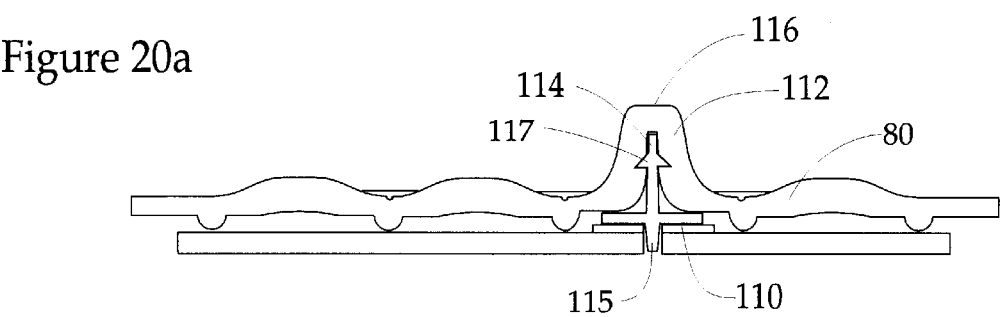
FIGS. 20a and 20b show cross sectional views of a environmentally sealed keypad and cursor control device combination.

FIG. 20a shows a cross sectional view of the elastomeric sheet 80 with a pointing device 112. The cursor control point 116 is integral with the continuous elastomer material 80. A force transmitting member 114, transmits force from the cursor control point 116 to the force sensor 110, shown mounted above the printed circuit board 94. A barb 117 retains the continuous elastomer material 80 against the printed circuit board 94. Alignment pin 115 geometrically constrains force transmitting member 114 with respect to the printed circuit board 94. Complete integration of the pointing device 112 allows the product to be completely sealed from the environment thereby offering a robustness not otherwise available.

Figure 20B:
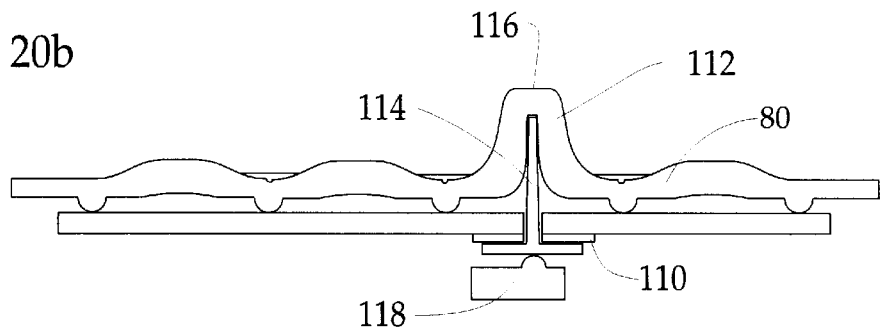

FIG. 20b shows a cross sectional view of the elastomeric sheet 80 with force sensor 110 mounted below the printed circuit board 94. Support 118 prevents excessive force from dislodging the force transmitting member 114.

FIG. 21 shows the structure on the underside of the elastomer material 80 offset with respect to the structure of the contact surface 90, shown dashed. This embodiment places the interstices of associated key caps 14 over a single switch and the centers of contoured dome 52 over a set of associated switches. This implementation is counter intuitive (as the combination key caps actuate individual switches and the individual key caps operate combination of switches) yet offers distinct advantage. Because the contoured domes 52 provide a small contact point, the force of the finger is concentrated into the region of associated key switches. Such an embodiment blurs the distinction between "individually operable" keys and "combination" keys. However, this modification is clearly within the broader aspects of the invention.

FIG. 22 shows one of many alternate embodiments of strike pad switch 59, a radial pattern with an auxiliary pad 75.

FIG. 23 shows a generic layout of the physical key switch matrix used to eliminate electrical ambiguities associated with the activation of multiple key switches of a traditional matrix. By superimposing two matrices, here represented by 1) even numbered intersections and 2) odd numbered intersections, it reduces the ambiguities of identifying diagonally oriented keys. By superimposing four matrices, here represented by each of the four numbers, a higher degree of ambiguity is eliminated.

While particular embodiments of the particular invention have been shown and described, it will be obvious to those skilled in the art that changes and modifications may be made without departing from this invention in its broader aspects and therefore, the appended claims are to encompass within their scope all such changes and modifications as fall within the true spirit and scope of this invention. Accordingly, the scope of the invention should not be limited to the embodiment illustrated, but by the appended claims and their legal equivalents.

I claim:

1. A compact keyboard structure including:

a first plurality of key regions disposed substantially in a first plane, said first plane disposed proximate to a substrate, wherein the distance in at least one direction between the centers of adjacent ones of said first plurality of key regions, as measured along a primary axis, is less than, or approximately equal to half of the width of an adult human finger;

a first plurality of legend zones, said first plurality of legend zones disposed proximate to a second plane, said second plane to be elevated above said first plane, each one of said first plurality of legend zones disposed to align centrally with an associated one of said first plurality of key regions, and each one of said first plurality of legend zones to be significantly smaller in area than half of the width of an adult human finger by half of the width of an adult human finger such as to provide said adult human finger means to exert force upon one of said first plurality of key regions without exerting force on an adjacent one or ones of said first plurality of key regions;

a second plurality of key regions, each one of said second plurality of key regions including one of a plurality of interstitial points, each one of said interstitial points defined as being approximately equidistant between the centers of four adjacent ones of said first plurality of key regions, each one of said second plurality of key regions centered on an associated one of said interstitial points; and a second plurality of legend zones disposed proximate to said first plane and each one of said second plurality of legend zones disposed to align centrally with the center of an associated one of said second plurality of key regions.

2. The compact keyboard structure of claim 1 wherein the width of the human finger is defined as a human finger unit, such that said structure is N human finger units by M human finger units, and the number of functions available on the keyboard structure is given by 8MN−2N−2M+1.

3. The compact keyboard structure of claim 1 wherein each one of said second plurality of legend zones comprises a key structure, said key structures being comprised of a single, continuous, undivided volume of material.

4. The compact keyboard structure of claim 1 wherein a structure that comprises and connects said first plurality of key regions, said first plurality of legend zones, said second plurality of key regions and said second plurality of legend zones is a single, continuous, volume of material.

5. The compact keyboard structure of claim 4 wherein said single, continuous, volume of material is elastomeric.

6. The compact keyboard structure of claim 1 further including a third plane which contains a matrix of lines or grooves that together define boundaries between said first plurality of key regions, wherein said matrix of lines or grooves does not exist in said first or second planes.

7. The compact keyboard structure of claim 1 further including:

a switch matrix disposed below said first plane; and a plurality of nubs, each one of said plurality of nubs disposed equidistant to the centers of two adjacent ones of said first plurality of key regions, said plurality of nubs disposed between said first plane and said switch matrix.

8. A keypad device of the type that includes a first plurality of output functions in which each of said first plurality is activated as a consequence of an activation of the switch means of an associated four or more individual key cap means, each of said associated four or more individual key cap means to have an individual output function, wherein the number of individually actuatable key cap means associated with one of said first plurality of output functions define a first quantity in which the quantity of a plurality of key switch means associated with one of said first plurality of output functions is greater than said first quantity.

9. The keypad device of claim 8 wherein the distance in at least one direction between the centers of adjacent ones of said associated four or more individual key cap means, as measured along a primary axis, is less than, or approximately equal to half of the width of the human finger.

10. The keypad device of claim 8 wherein:

said switch means include a first plurality of subsets of the key switch means, wherein all of the key switch means of a first subset are actuated in association with a unique one of said first plurality of output functions:

said switch means include a second plurality of subsets of the key switch means, each of said second subsets having a single key switch means which is actuated in association with a unique one of said individual output functions; and the intended output function is determined by control electronics identifying a sole activated subset from within said first and second pluralities.

11. The keypad device of claim 8 further including an electrical control means for identifying which of said key switch means are actuated and which of said key switch means are not actuated in determining which specific one of said first plurality of output functions to output.

12. The keypad device of claim 8 wherein analog sense means are used to determine force levels on individual switches of said plurality of key switch means, thereby allowing peak force location to be identified.

13. The keypad device of claim 8 wherein a switch activation history is used to determine intent of a user.

14. The keypad device of claim 8 wherein:

said switch means include a first plurality of subsets of the key switch means, wherein all of the key switch means of a first subset are actuated in association with a unique one of said first plurality of output functions.

15. A miniaturized ergonomic keypad system including:

a plurality of individually operable key switch means, each one of said plurality to output an associated one of a first plurality of output functions when pressed, wherein the distance in at least one direction between the centers of adjacent ones of said plurality of individually operable key switch means, as measured along a primary axis is approximately half the width of the human finger or less, each one of said plurality to include an elevated central area;

a plurality of combinationally operable function output means, each one of said plurality of combinationally operable function output means disposed approximately centrally about a point equidistant to four adjacent ones of said plurality of individually operable key switch means, each one of said plurality of combinationally operable function output means to output one of a second plurality of output functions when at least one pair of opposing diagonal, adjacent ones of said individually operable key switch means are simultaneously pressed wherein the width of the human finger is defined as a human finger unit and said system is N human finger units by M human finger units, and the number of functions provided by said system is given by $8MN-2N-2M+1$.

16. The miniaturized ergonomic keypad system of claim 15 wherein said plurality of combinationally operable function output means include a legend surface comprised of a single, continuous, undivided volume of material.

17. The miniaturized ergonomic keypad system of claim 15 wherein a structure that comprises and connects said plurality of individually operable key switch means and said plurality of combinationally operable function output means is a single, continuous, volume of material.

18. The miniaturized ergonomic keypad system of claim 15 wherein each of said elevated central areas is of a significantly small dimension such as to provide said human finger a means to exert force upon one of said plurality of individually operable key switch means without exerting force on an adjoining one or ones of said plurality of individually operable key switch means.

19. The compact keyboard structure of claim 15 further including:

a switch matrix disposed below both said first plurality and said second plurality; and a plurality of nubs, each of said plurality of nubs disposed equidistant between the centers of two adjacent ones of said plurality of individually operable key switch means, and said plurality of nubs disposed in a plane with said switch matrix on a first side and said plurality of individually operable key switch means and said plurality of combinationally operable function output means on a second side.

20. The keypad device of claim 15 wherein analog sense means are used to determine force levels on individual switches of said plurality of individually operable key switch means, thereby allowing peak force location to be identified.

* * * * *